Oct. 27, 1959
M. FRÖLICH
2,910,328
TURBINE FOR COOLING A FLUID BY EXPANSION
Filed June 25, 1958
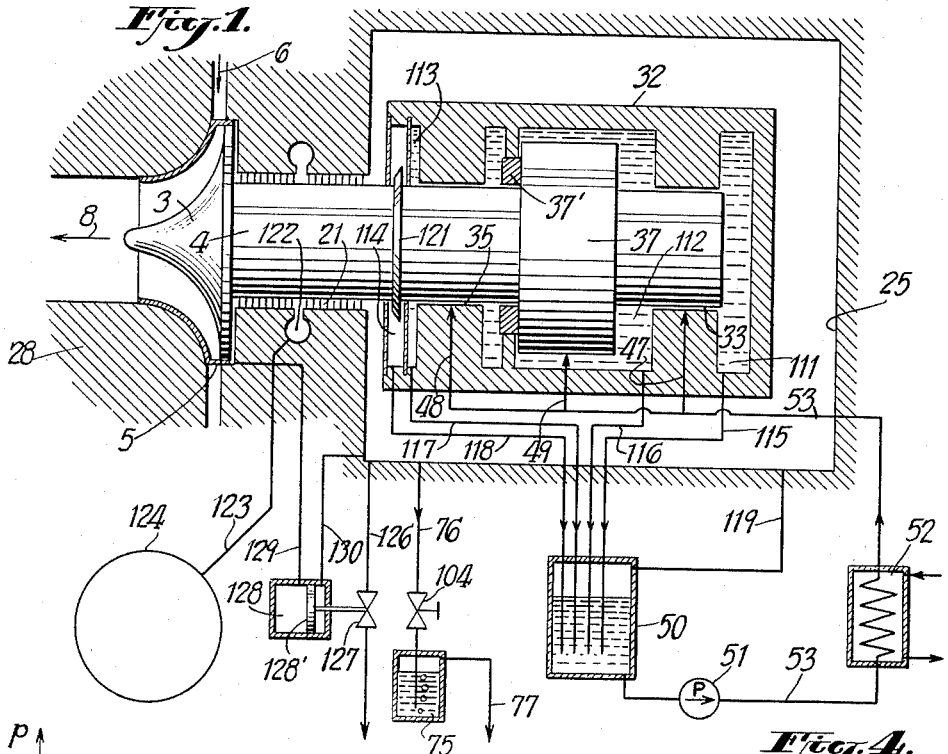
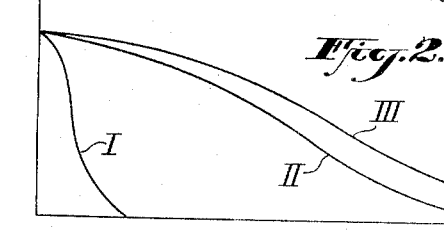
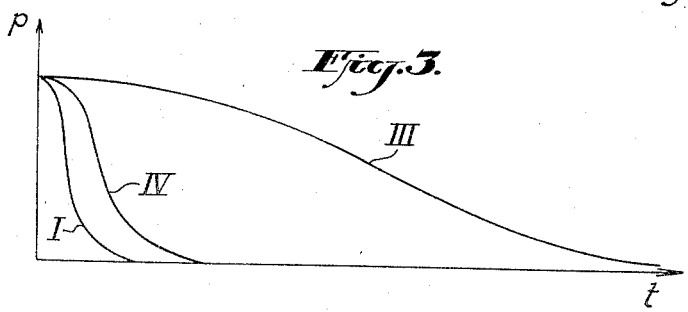
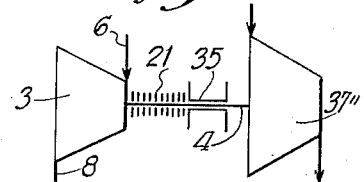
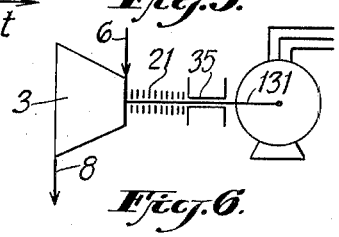
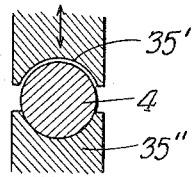
INVENTOR
MARTIN FRÖLICH.
BY
ATTORNEY

United States Patent Office 2,910,328
Patented Oct. 27, 1959

2,910,328

TURBINE FOR COOLING A FLUID BY EXPANSION

Martin Frölich, Raterschen, Zurich, Switzerland, assignor to Sulzer Freres, S.A., Winterthur, Switzerland, a corporation of Switzerland Application June 25, 1958, Serial No. 744,385

Claims priority, application Switzerland June 28, 1957

4 Claims. (Cl. 308—36.3)

The present invention relates to a turbine in which a gas, for example, a coolant of a compression cooling plant is expanded for cooling the gas, more particularly to a turbine including a liquid lubricated bearing, a gas chamber surrounding the bearing and being provided with a gas discharge conduit having a throttling device interposed therein, and a labyrinth packing on the shaft of the turbine and located between the turbine and the bearing, the interior of the turbine communicating through said packing with the gas chamber. During normal operation, the throttling device in the gas discharge conduit of the chamber surrounding the bearing maintains a lower pressure at the end of the labyrinth packing which faces the bearing than the pressure at the end of the packing facing the turbine. According to the invention a gas accumulator is connected with the labyrinth packing which accumulator is supplied with gas from and in which pressure is maintained by the turbine when the plant is in operation.

Because of the provision of the gas accumulator the pressure in the labyrinth packing, upon a rapid decrease of the pressure in the turbine as may occur when the turbine is stopped or at certain operating irregularities, decreases more slowly than the pressure in the chamber surrounding the bearing which decreases because of the provision of the throttled gas discharge conduit. This desired effect is produced, if the volume of the gas accumulator is so great that the time required for releasing the gas from the accumulator into the labyrinth packing is greater than the time needed for releasing the gas through the throttled gas discharge conduit from the chamber surrounding the bearing. In this way the flow of lubricant fumes of relatively high temperature, for example, room temperature of about +20° C. is prevented from the space surrounding the bearing, which space may contain a brake device, through the labyrinth packing into the turbine, whose temperature is lower and in certain cases much lower, for example, −90° C. so that the lubricant fumes would freeze and settle in the turbine.

In an embodiment of the invention the gas accumulator is connected with one of the middle stages of the labyrinth packing. Preferably an annular space surrounding the turbine shaft is provided in the central portion of the longitudinal extension of the packing which space communicates with the labyrinth spaces as well as with the gas accumulator.

A device which is responsive to the pressure in the turbine may be provided for automatically opening the throttle device in the discharge conduit of the chamber surrounding the bearing. This assists the effect of the gas accumulator, namely, a slower reduction of the pressure per time unit in the labyrinth packing than in the chamber surrounding the bearing; by suitably adjusting the automatic control the difference between the pressure drop per time unit in the labyrinth packing and in the chamber containing the bearing can be made so great that even under unfavorable condition no lubricant fumes can reach the turbine from the gas accumulator.

The novel features which are considered characteristic of the invention are set forth with particularity in the appended claims. The invention itself, however, and additional objects and advantages thereof will best be understood from the following description of embodiments thereof when read in connection with the accompanying drawing, in which:

Fig. 1 is a diagrammatic illustration of an apparatus according to the invention.

Figs. 2 and 3 are diagrams showing the pressures in various parts of the apparatus according to Fig. 1 at different times after the expansion turbine has been stopped or after a disturbance causing a pressure drop in the turbine.

Figs. 4, 5 and 6 diagrammatically illustrate three different modifications of the apparatus according to Fig. 1.

Referring more particularly to the drawing, numeral 28 designates a casing containing a rotor 3 of a turbine for reducing the temperature of a gas by expansion. The operating temperature of the turbine is low, for example, −90° C. A compressed fluid is supplied to the turbine rotor through a conduit 6, the expanded fluid leaving the turbine through a conduit 8. The rotor 3 is fast on one end of a shaft 4. A friction brake device which is lubricated by a liquid, for example oil, is connected with the other end of the shaft 4. This device includes a brake body 37 which is fast on the shaft 4 and an unrotatable brake ring 37′ which can be pressed against the body 37 by conventional means, not shown. The brake is contained in a casing 32 which also forms two bearings 33 and 35 for the shaft 4. The liquid lubricated bearing consists essentially of the parts 32, 33 and 35. If desired, the brake body 37 may be made to fit the cavity in the casing 32 so that it replaces the bearing 33. The brake device and the bearings, including the casing 32, are located within a chamber 25 in which there is the normal temperature of the surrounding atmosphere, for example, +20° C.

The bearings 33 and 35 and the brake apparatus 37, 37′ are supplied with a liquid lubricant from a container 50 through a main conduit 53 containing a pump 51 and a cooler 52, and through pipes 47, 48 and 49 which are connected with the conduit 53. The casing 32 has chambers 111, 112, 113 and 114 for collecting the lubricant from the bearings, from the brake apparatus and from a throwing ring 121 on the shaft 4. The lubricant is returned from the collecting chambers to the container 50 through pipes 115 to 118, respectively. The upper portion of the container 50 communicates with the chamber 25 through a pipe 119 so that the pressures in the chamber 25 and in the container 50 are the same.

A gas discharge conduit 76 containing a throttle valve 104 is connected with the chamber 25, the conduit 76 terminating in a transparent vessel 75 to whose upper portion a relieve pipe 77 is connected.

The turbine rotor 3 is separated from the bearings and from the brake apparatus by means of a labyrinth packing 21 which communicates with the interior of the turbine casing 28 as well as with the chamber 25. An annular space 122 is provided in the central portion of the longitudinal extension of the packing 21 around the shaft 4 which space communicates with a gas accumulator vessel 124.

A gas discharge pipe 126 is connected with the chamber 25, a valve 127 being interposed in the pipe 126. The valve 127 is automatically controlled by means of a differential pressure regulator 128. The latter may consist of a cylinder in which a control piston 128′ is reciprocable which piston is connected with the valve 127 for operating the valve. The space in the cylinder on one side of the piston 128' is connected through a pipe 129 with the interior of the turbine casing 28 at the inlet 5 of the rotor 3. The space on the other side of the piston 128' is connected by a conduit 130 with the interior of the chamber 25.

The apparatus operates as follows:

The pressure in the turbine is, for example, 12 to 13 atmospheres absolute at normal operation. The pressure in the accumulator vessel 124 and in the labyrinth packing 21 is substantially the same as in the turbine. A somewhat lower pressure is maintained in the chamber 25 by slightly opening the valve 104 so that a small amount of gas can flow through the pipe 76, through the vessel 75 and through the pipe 77 to the outside so that there is a slight flow maintained from left to right in the labyrinth packing 21. This prevents flow or diffusion of lubricant fumes from the chamber 25 through the labyrinth packing towards and into the turbine. The pump 51 continuously supplies lubricant from the container 50 to the bearings 33, 35 and to the brake device 37. The lubricant is returned through pipes 115 to 118 to the storage vessel 50.

The valve 127 in the gas discharge conduit 126 is closed during normal operation of the apparatus.

If the turbine is stopped the pressure therein falls rapidly, as shown by the curves I in Figs. 2 and 3, so that the differential pressure regulator 128 is actuated by the difference of the pressures in the turbine casing 28 and in the chamber 25, opening the valve 127. Thereupon the pressure in the chamber 25 decreases according to curve IV in Fig. 3, somewhat delayed with respect to the pressure decrease in the turbine. The volume of the gas accumulator vessel 124 is so large that, considering the throttle action of the labyrinth packing, the pressure in the vessel 124 decreases more slowly and, in any case, slower than the pressure in the chamber 25. This slowed up pressure decrease is illustrated by the curves III in Figs. 2 and 3.

In a modified arrangement in which the elements 126 to 130 are omitted the pressure in the chamber 25 decreases, for example, according to curve II in Fig. 2, the pressure decrease in the chamber being more delayed than is possible with the differential pressure regulating apparatus 128 to 130 but being quicker than the pressure drop in the accumulator vessel 124. Also, in this case, a flow from right to left in the packing 21 is prevented so that lubricant fumes cannot reach the turbine from the chamber 25. Because of the higher pressure maintained in the vessel 124 there is flow from left to right, i.e., towards the chamber 25 at least in the right half of the packing 21. This flow can easily be made so great that not only flow but also diffusion of lubricant into the turbine is prevented.

Without departing from the scope of the invention the gas discharge pipe 126 may be omitted and the valve 104 in the pipe 76 be replaced by the automatically controlled valve 127. In this case also the vessel 75 may be omitted to avoid splashing and loss of liquid through the pipe 77 upon sudden opening of the valve 127 when the pressure in the turbine drops. If desired, the right side of the pressure responsive device 128 may be left open and the pressure sensing pipe 130 be omitted so that the valve 127 is controlled only in response to the pressure in the turbine.

The chambers 111, 112 and 113 may be completely filled with lubricant during normal operation so that as many as possible rotating parts operate in the lubricant and formation of oil fumes is avoided. Of course, oil fumes cannot be entirely avoided at the thrower 121 and in the chamber 114.

Formation of oil fumes in the vessel 50 can be avoided by placing the ends of the pipes 115 to 118 so low in the container 50 that they are always immersed in the lubricant. In this case there is no intensive contact between the return lubricant and the gase above the liquid level in the vessel 50 and in the chamber 25.

The last mentioned arrangements reduce the amount of fumes in the container 25 and also in the gas leaving the system through the pipes 76 and 77. If desired, the gas leaving the apparatus through the pipe 77 may be purified and returned to the turbine circuit.

Instead of the frictional brake apparatus 37 shown in Fig. 1 a blower 37", as diagrammatically shown in Fig. 4, or an electric generator 131, as shown in Fig. 5, may be used. The bearing 33 may be omitted so that the brake apparatus, blower, or electric generator are at the end of the shaft 4.

Instead of providing a brake body 37, as shown in Fig. 1, one half of the bearing 35 may be arranged vertically movable and used as a brake as diagrammatically shown in Fig. 6 in which the lower half 35" of the bearing is stationary and the uper half 35' is vertically movable.

I claim:

1. A turbine for cooling a gas by expansion comprising a casing, a rotor in said casing, a shaft connected with said rotor, a bearing for said shaft, a chamber surrounding said bearing, a gas discharge pipe connected with said chamber and containing a throttling device, a labyrinth packing surrounding said shaft and being interposed between said casing and said chamber, said throttled discharge pipe effecting a pressure in the part of the labyrinth packing which is opposite said bearing which pressure is lower than the pressure in the part of said labyrinth packing which is opposite said casing, and a closed gas accumulator vessel communicating with said labyrinth packing for receiving gas from said casing through said packing when the pressure in said casing is higher than the pressure in said vessel and for discharging gas into said packing when the pressure in said casing is lower than the pressure in said vessel.

2. A turbine as defined in claim 1 in which said labyrinth packing has a central portion, said accumulator vessel communicating with said central portion.

3. A turbine as defined in claim 1, including an annular chamber surrounding said shaft in the center portion of the longitudinal extension of and communicating with said packing, said gas accumulator vessel being connected with and communicating with said annular chamber.

4. A turbine as defined in claim 1, including control means connected with and being responsive to the pressure in said casing, said control means being connected with said throttling device for automatically opening said device when the pressure in said casing decreases below a predetermined pressure.

References Cited in the file of this patent

FOREIGN PATENTS 270,270    Great Britain _____ July 11, 1928